Aug. 24, 1937.   J. D. LANGDON   2,091,076
WHEEL AND TIRE CARRIER
Filed March 5, 1935    4 Sheets-Sheet 1
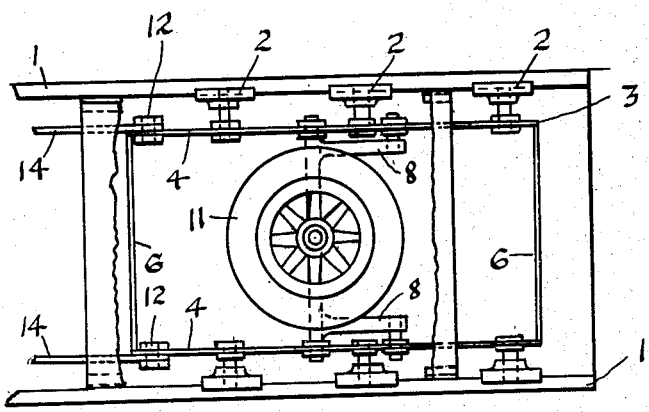
Fig. 1.
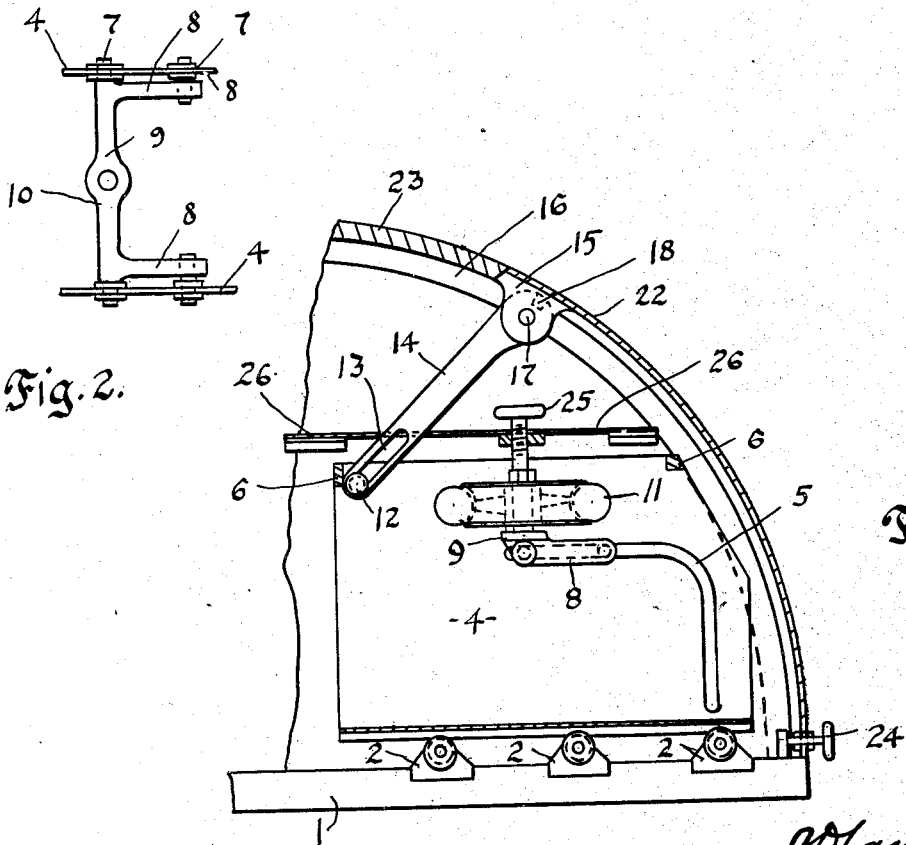
Fig. 2.
Fig. 3.
J. D. Langdon
INVENTOR.
BY
ATTORNEY.

Aug. 24, 1937.  J. D. LANGDON  2,091,076
WHEEL AND TIRE CARRIER
Filed March 5, 1935   4 Sheets-Sheet 2
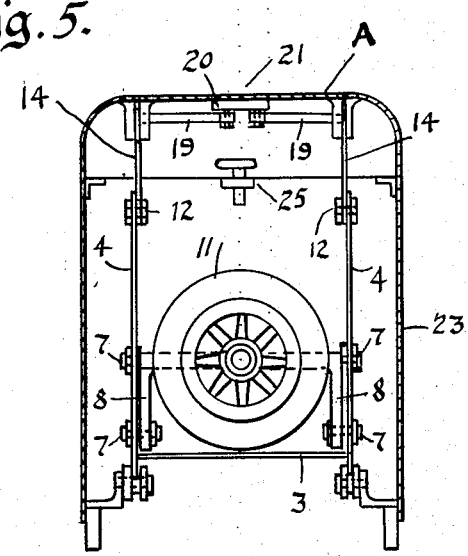
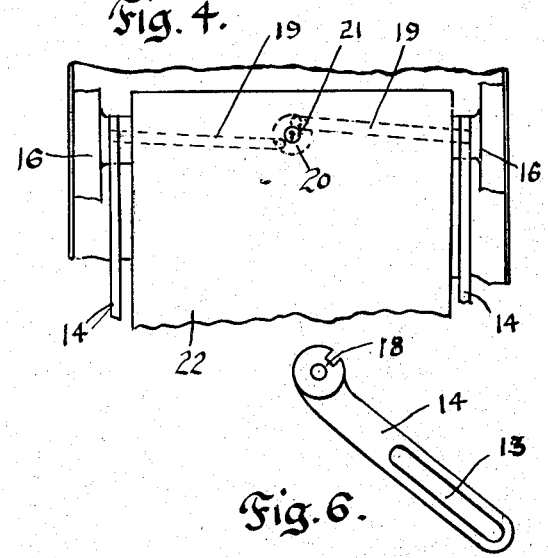
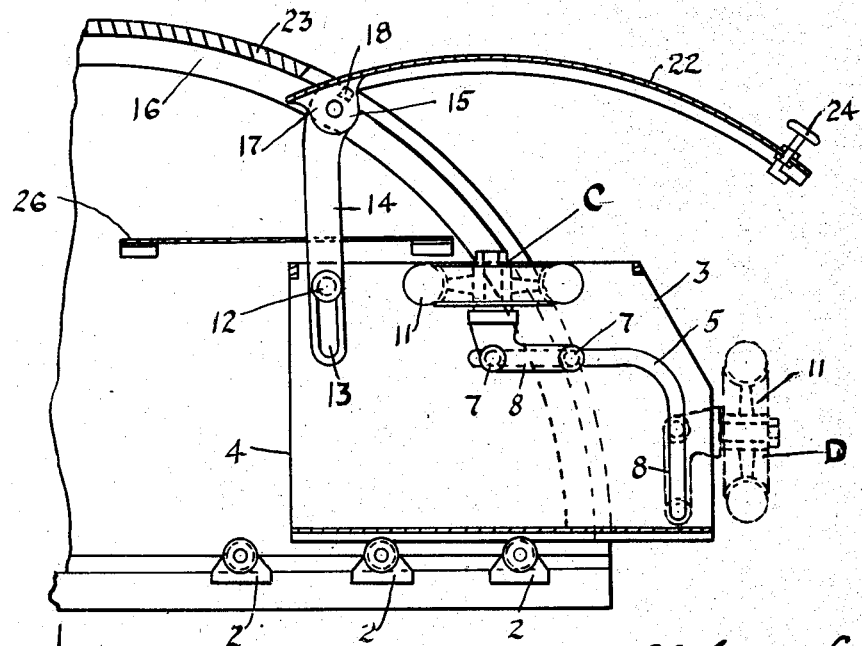

Aug. 24, 1937. J. D. LANGDON 2,091,076
WHEEL AND TIRE CARRIER
Filed March 5, 1935 4 Sheets-Sheet 3
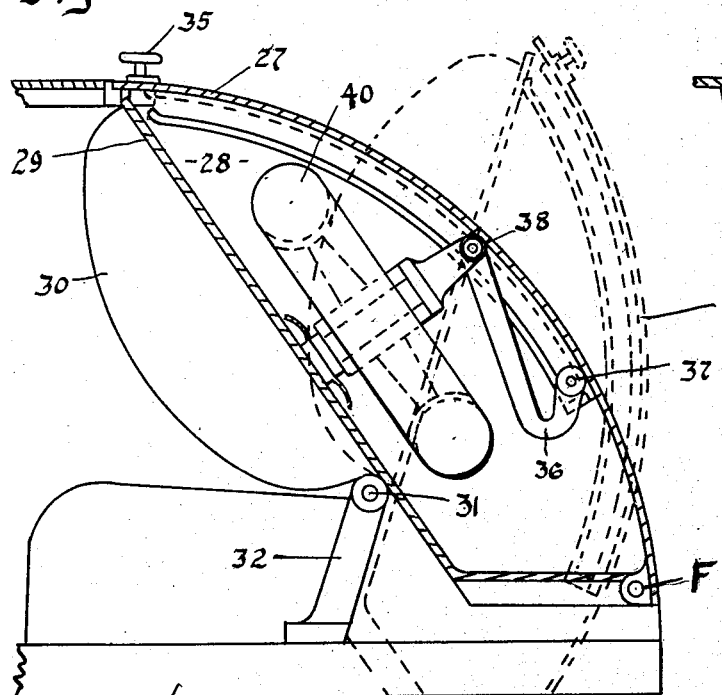
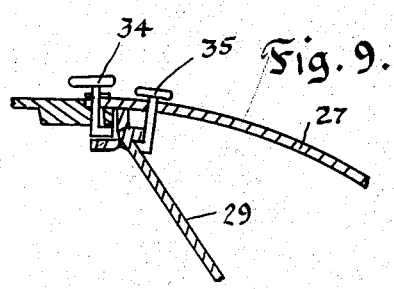
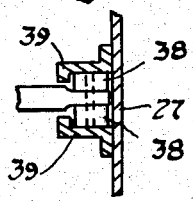
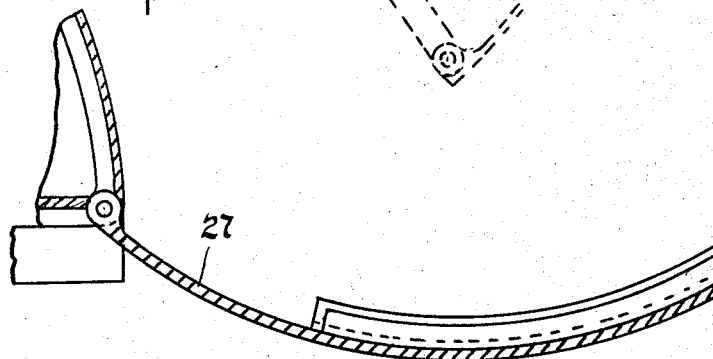
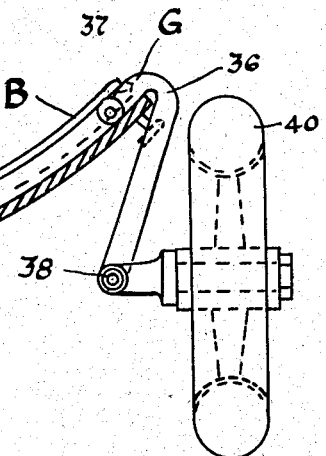
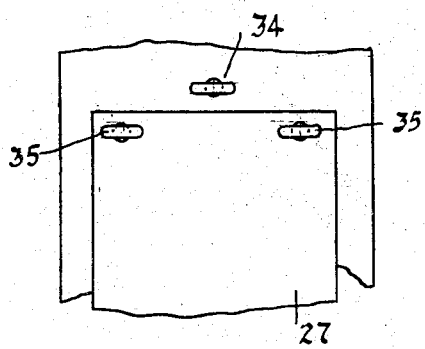
J. D. Langdon
INVENTOR
BY
ATTORNEY

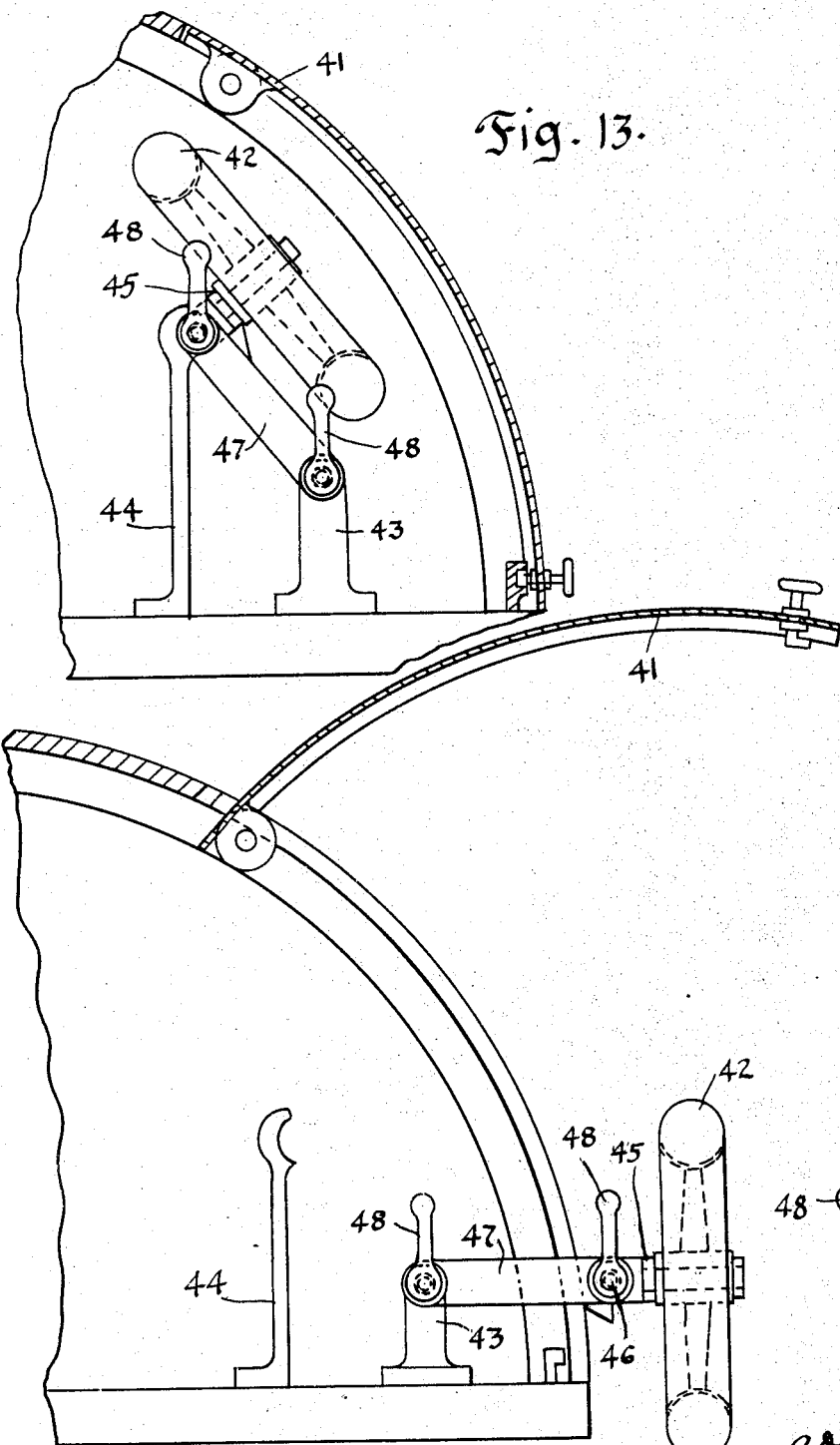

Patented Aug. 24, 1937

2,091,076

UNITED STATES PATENT OFFICE 2,091,076

WHEEL AND TIRE CARRIER

Jesse D. Langdon, La Canada, Calif., assignor of two-thirds to George J. Kilgen and Edward W. Todd, both of Los Angeles, Calif.

Application March 5, 1935, Serial No. 9,457

7 Claims. (Cl. 296—37)

My invention relates to wheel and tire carriers, particularly of the type for use upon automotive vehicles.

The primary object of my invention is to provide a wheel or tire carrier adapted to be attached to a vehicle for conveniently carrying spare wheels and/or tires, said tire carrier adapted to be easily moved to extend from and be retracted toward the frame or body of a vehicle to which it may be attached.

Another object is to provide a wheel and/or tire carrier whereby the wheel and/or tire may be attached to said carrier or detached therefrom while the weight of the wheel and/or tire is allowed to rest on the ground.

A still further object is to provide a wheel and/or tire carrier adapted to change the position of the wheel and/or tire in relation to the body of a vehicle for the purpose of conveniently storing and transporting, or removing for use, a spare wheel and/or tire, including means to bind said wheel and/or tire carrier rigidly in a suitable position to be transported with a minimum of rattling noises and to prevent shaking about.

A still further object is to provide a wheel and/or tire carrier adapted to be attached to the door of an automotive vehicle, including a compartment in said door adapted to be moved as a unit with or independent of a door assembly comprising said door and compartment.

A still further object is to provide a suitable extensible and retractable wheel and/or tire carrier adapted to be extended from or retracted into a suitable receptacle in a vehicle body.

Other and further objects and advantages will be hereinafter set forth, and the novel features of structure and operation described, as illustrated by the drawings and covered by the claims.

It is understood that the drawings used for the purpose of illustration do not confine me to the structure shown, and my invention may be changed according to the exigencies of its use, within the scope of what is claimed.

The illustrations shown by the drawings are diagrammatic, of which,

Sheet 1:

Fig. 1 is a top view of a fragmentary portion of an automobile frame 1, with the body removed, having mounted thereon a wheel and/or tire carrier adapted to be moved toward and extended from the frame of a vehicle to which it may be attached.

Fig. 2 is a detail top view of the attaching bracket and proximal pivot of a spare wheel and/or tire carrier attached to a fragmentary portion of a mobile carrier frame side members.

Fig. 3 illustrates a fragmentary portion of the rear end of an automobile body and frame, partly in longitudinal section as at A Fig. 5 of Sheet 2:

Sheet 2:

Fig. 4 is a diagrammatic top view of a fragmentary rear portion of an automobile body illustrating hinge locking means.

Fig. 5 is a transverse cross section of the rear end of a body, showing wheel and/or tire in position D as of Fig. 7.

Fig. 6 is a detail of the kick-out arm.

Fig. 7 is a longitudinal section of a fragmentary portion at A Fig. 5, illustrating the mobile carrier withdrawn from the body of an automotive vehicle.

Sheet 3 shows an alternative equivalent of Sheets 1 and 2, whereby the door of an automotive vehicle is substituted for the mobile carrier of Figs. 1 to 7, inclusive.

Fig. 8 is a diagrammatic longitudinal section of a fragmentary rear portion of an automobile body and frame, showing in dotted lines the open position of the compartment door.

Fig. 9 is a fragmentary portion illustrating the detail of separate compartment body and door locks.

Fig. 10 is a fragmentary cross section detail as at B Fig. 11.

Fig. 11 is a small, fragmentary cross section of the rear end of an automotive vehicle with an open door attached, illustrating the open position of a compartment tire and/or wheel carrying rear door portion.

Sheet 4 illustrates a still further alternative form of wheel and/or tire carrier adapted to change the position of a spare wheel and/or tire by limited alternative structure as to that shown in Sheets 1, 2 and 3.

Fig. 12 is a diagrammatic, fragmentary top view of the rear end of an automotive vehicle, showing the position of door and body lock handles.

Fig. 13 is a diagrammatic, fragmentary, longitudinal section of the rear body portion and door of an automotive vehicle, with the wheel and/or tire carrier in retracted position within the body receptacle.

Fig. 14 is a longitudinal section of a fragmentary portion of the door and body set on the frame of an automotive vehicle, showing the wheel and/or tire carrier in extended position.

The structure comprising my invention, including the operation thereof, is as follows:

Sheets 1 and 2 use the same numerals and letters to indicate like parts and functions, while Sheets 3 and 4 are independently numbered by a continuation of numbers to illustrate alternative means of accomplishment.

Auto frames 1—1 have mounted on each member rollers 2—2—2; movably carried thereon is a carrier frame 3, comprising two side members 4—4, having slots 5—5 therein. Side members 4—4 are bound together by girders 6—6. Rollers or distal pivots 7—7—7 on arms 8—8 are grooved to fit in slots 5—5, said arms 8—8 being an integral portion of wheel rack 9, which has in the center thereof a false hub 10, upon which is mounted a spare wheel 11, a kick-out pin 12 is provided attached to side members 4—4 and kick-out slots 13 in kick-out arm 14 is provided to receive said kick-out pin 12, one kick-out pin 12 and one kick-out arm 14 being provided at each side of tire carrier frame 3.

Ejection or kick-out arms 14—14 are held at each side between hinge flange 15 and body flange 16, and proximal pivot or hinge pin 17 extending therethrough. Tumbler slot 18 in kick-out arm 14 is adapted to take the end of tumbler rods 19, which are operably attached to disk 20. An ejector or kick-out lock 21 adapted to turn by the use of a key or handle to operate disk 20 is located at the center in the hinged end of the door 22. The door 22 may be opened and closed independently of the movement of kick-out arm 14.

The flange 16 of body 23 is not perforated. Therefore the ends of tumbler rods 19—19 are limited in their movement by said body flange 16 when disk 20 is rotated. When the door 22 is unlocked by handle 24, the kick-out arm 14, having been previously locked in a unit with the door 22 by the rotation of disk 20, the lifting of the door will cause the carrier 3 to be moved out through the door opening. The upper end of the kick-out slot 13 in the kick-out arm 14 acts as a stop to hold the carrier frame 3 from falling out of the door aperture.

When the door 22 is in open position, the bracket binder 25, which impinges the hub of wheel 11 and false hub 10, is loosened, said bracket binder 25 being threadedly inserted through the compartment floor 26, which is suitably attached to the inside of the automotive vehicle body into which the described device is built.

When the door 22 is opened with hinge flange 15—15 having a common pivot 17 and with ejector or kick-out arm 14 integrally locked, the door assumes the position illustrated by Fig. 7, Sheet 2. The tumbler rods 19—19 are illustrated by dotted lines, showing their relative position of attachment to the door 22.

When bracket binder 25 has been loosened, the wheel and/or tire may be moved from position C to position D, as of Fig. 7, changing the position of said wheel by moving arms 8—8 through slots 5 in members 4—4 for convenience in removing or replacing said wheel 11.

It will be seen that the door 22 can be opened and closed independently when tumbler rods 19—19 are withdrawn through slots 18 or in unison with carrier frame 3 when tumbler rods 19—19 are reinserted through tumbler slots 16 by rotating disc 20.

The drawings of Sheet 3 are related to the drawings of Sheets 1 and 2 as follows: Fig. 8 shows a top opening door 27 in which a compartment 28 is formed by partition 29 having mounted thereon a rumble seat back cushion 30, said partition 29 being hingedly attached to door 27, as at F. Hinge 31 is attached to partition 29 and provides the pivoting point whereby the whole compartment, including the wheel and/or tire carrier assembly, can be opened and closed as a door unit.

The hinge brackets 32 are attached to each side of the rumble seat 33.

When the handle 34 in the center of the body is turned, the door may be opened by lifting on the handles 35—35 located at each side of the closing edge of the door 27 to position E shown by dotted lines of compartment assembly.

If the handle 34 is left in locked position, the inner partition 29 remains in closed position. The wheel and/or tire carrier comprising wheel 40 and other parts attached to door 27 is open to the position illustrated by Fig. 11.

The bracket arm 36 carries large rollers 37—37 and smaller distal pivots or rollers 38—38, which are movable in a grooved slot formed by members 39—39, said grooved slot has a reduced aperture at G, so that the larger rollers 37—37 cannot be removed from the groove formed by members 39—39. However, the smaller rollers 38—38 move through the aperture allowing the wheel and/or tire 40 to assume the position shown as in Fig. 11.

The bracket arm 36 is goose-necked in shape as shown by the illustrations, said goose-neck providing for clearance when the wheel and/or tire is placed in the position as of Fig. 11.

It will be seen that the position of spare wheel and/or tire in compartment 28 may be changed by means of the mechanism illustrated so that the wheel 40 can be extended a considerable distance away from the body or frame of an automotive vehicle, providing practical means whereby said wheel 40 may be set on the ground when it is removed from or put back upon the bracket member 36. Thus it will be seen that the spare wheel and/or tire carrier may be extended from or retracted toward the body or frame of an automotive vehicle in the same relative manner as is illustrated on Sheets 1 and 2, this being accomplished through the use of the same elements of pivotal function and by the use of similar mechanical elements of operation to change the position of the wheel and/or tire as set forth in the objects and purposes hereof.

Sheet 4, Fig. 13, the door 41 opens from the bottom opposite to compartment door 27 as of Sheet 3. The wheel 42 of Fig. 13 is mounted on a hinged stand 43 and a bracket supporting stand 44 is provided. The false hub or bracket 45 is hinged at 46 forming a distal pivot, also at junction of handles 48 with links 47—47 a proximal pivot is provided, which may be locked to both hinged stand 43 and false hub or bracket 45 by means of a threaded opening through one of the links 47 in conjunction with handles 48—48 to allow said links 47—47 to be drawn together as illustrated by Fig. 15. Thus it will be seen that wheel and/or tire carrier as of Sheet 4 may be extended from and retracted toward the body and frame of an automotive vehicle, said carrier being adapted to be rigidly held and locked in any desired position.

Having described my invention, that which is new and novel and of use to the art, I claim:

1. A wheel and tire carrier mounted on the frame of an automotive vehicle, said wheel and tire carrier comprising rollers mounted on said frame, a carrier frame riding on said rollers, said carrier frame comprising side members having slots therein, said side members bound together by girders, rollers journaled in said slots in said side members, said rollers attached to arms, said arms integral with a wheel and tire bracket, elements attached to said side members, said elements adapted to be locked integral with a lever whereby the movement of said lever will eject said wheel and tire carrier from a receptacle in an automotive vehicle, including means to hold said wheel and tire carrier in attached relationship to an automotive vehicle and prevent said wheel and tire carrier from being disconnected from the frame or body of said automotive vehicle by the movement of said lever.

2. A wheel and tire carrier as of claim 1, including a door adapted to be locked integral with lever means for simultaneous movement of said door and said wheel and tire carrier, including means to detach said door from said wheel and tire carrier for independent movement.

3. In combination with a motor vehicle having two compartments within said motor vehicle with a door common to both of said compartments, a wheel and tire carrier comprising interlocked connecting elements attached to link elements connected between said door and a wheel or tire bracket disposed in one of the compartments, including means connected with said door to disconnect said link elements between said door and said wheel or tire bracket, said door being capable of movement in unison with said tire bracket or independent movement of said door separate from said wheel and tire carrier and bracket, to provide means to permit access to either compartment separate from one another by the use of said door common to both compartments.

4. A wheel and tire carrier for motor vehicles, comprising a door, a compartment within said door, said compartment formed by an outside door on one side and a secondary inside door forming a partition on the opposite side, a wheel or tire bracket disposed between said outside door and said secondary inside door, including means to connect said outside door and said secondary door to form a compartment within the first named door to carry said wheel and tire bracket.

5. A wheel and tire carrier comprising a pivotally attached lever carried by a motor vehicle, a tire bracket slidably attached to said lever, said bracket adapted to slide in a longitudinal direction parallel with said lever, connecting elements combined with said lever and said tire bracket to permit said lever to be moved to various positions and said tire bracket to be swung over beyond and around the end of said lever.

6. In combination with a motor vehicle body, a receptacle within said body, a wheel and tire carrier disposed within said receptacle, a bracket to carry a wheel or tire attached to said wheel and tire carrier, said wheel and tire carrier adapted to extend longitudinally from within said receptacle in said body, said bracket being capable of either horizontal or vertical movement outside of said receptacle, including means to permit changing of the attached position of a wheel or tire carried by said bracket from a horizontal to a vertical plane, or vice versa, to facilitate the removal or replacement of a wheel or tire while said bracket is disposed outside of said receptacle in any of various positions from a horizontal to a vertical plane.

7. In combination with a motor vehicle body, and disposed within a receptacle within said body, a wheel and tire carrier capable of being extended from within said receptacle, a door disposed to close said receptacle, a lever attached between said door and said wheel and tire carrier within said receptacle, interlocking means and means to operate said interlocking means carried by said door whereby said lever and said door are interlocked to operate in unison with said wheel and tire carrier and whereby said lever and said door may be detached from one another for the independent movement of said door.

JESSE D. LANGDON.